United States Patent
Morgan

(10) Patent No.: US 7,377,464 B2
(45) Date of Patent: May 27, 2008

(54) SEATBELT RETRACTOR HAVING AN INERTIAL SENSOR WEIGHT WITH A GUIDE SURFACE

(75) Inventor: Christopher D. Morgan, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 385 days.

(21) Appl. No.: 11/092,278

(22) Filed: Mar. 29, 2005

(65) Prior Publication Data

US 2006/0219833 A1    Oct. 5, 2006

(51) Int. Cl.
*B65H 75/48* (2006.01)

(52) U.S. Cl. .................. 242/384.5; 242/384.6

(58) Field of Classification Search ............. 242/384.5, 242/384.6, 383.2
See application file for complete search history.

(56) References Cited

U.S. PATENT DOCUMENTS

| | | | |
|---|---|---|---|
| 4,084,840 A * | 4/1978 | Buff et al. ................ | 297/478 |
| 4,101,093 A | 7/1978 | Colasanti et al. | |
| 4,343,444 A * | 8/1982 | Francis ................... | 242/384.4 |
| 4,344,589 A | 8/1982 | Rumpf | |
| 4,726,540 A | 2/1988 | Ches et al. | |
| 4,765,559 A * | 8/1988 | Crisp ...................... | 242/384.2 |
| 5,507,449 A | 4/1996 | Kohlndorfer | |
| 6,164,581 A | 12/2000 | Freeman et al. | |
| 6,688,547 B1 | 2/2004 | He | |
| 2004/0251367 A1 | 12/2004 | Suzuki et al. | |

FOREIGN PATENT DOCUMENTS

JP    61018542    1/1986

* cited by examiner

*Primary Examiner*—Sang Kim
(74) *Attorney, Agent, or Firm*—Lonnie Drayer

(57) ABSTRACT

A seatbelt retractor assembly (10) has a seatbelt retractor (14) and an actuator (26) for locking and unlocking the seatbelt retractor (1). An inertial sensor mass (30, 32, 33) detects changes in vehicle speed. The mass (30, 32, 33) has a guide surface (34, 35, 36) for interacting with the actuator (26). The guide surface (34, 35, 36) moves between an unlocking position in which the actuator (26) unlocks the seatbelt retractor (14) and a locking position in which the actuator (26) locks the seatbelt retractor (14). The guide surface (30) has an inner profile portion (62) and at least an outer profile portion (64). The actuator (26) is in contact with the inner profile portion (62) in the unlocking position while moving into contact with the outer profile portion (64) as the actuator (26) moves towards the locking position. The inner profile portion (62) causes a different acceleration of the actuator (26) than the outer profile portion (64).

2 Claims, 9 Drawing Sheets

SEATBELT RETRACTOR HAVING AN INERTIAL SENSOR WEIGHT WITH A GUIDE SURFACE

FIELD OF THE INVENTION

This invention relates to a seatbelt retractor assembly.

BACKGROUND OF THE INVENTION

A seatbelt for a passenger vehicle typically has a seatbelt retractor that serves to retract the belt into its housing. The belt is wound upon a spool in the housing. When the belt is drawn or protracted from its housing, the spool winds a retraction spring, which later retracts the unused portion of the belt onto the spool or withdraws the belt into its housing when not in use.

In the event of a crash, the seatbelt retractor has a lock that prevents the seatbelt from extending further from its housing. The lock may be actuated by an inertial sensor, which responds to changes in vehicle speed during the crash. When a large deceleration is detected, the inertial sensor triggers the lock of the seatbelt retractor to lock the spool and thereby secures the safety belt in place during the crash.

The inertial sensor has an inertial sensor mass that moves in response to changes in speed of the vehicle. This mass is mechanically linked to the lock by an actuator. When the mass moves, the actuator moves and causes movement of a locking pawl that locks the lock when the mass has moved in excess of a predetermined amount. The actuator rests on a surface of the mass. This surface is angled so that movement of the mass causes rapid movement of the actuator and consequently the locking pawl. While rapid movement of the components of the inertial sensor and lock are desirable for safety, this same feature causes undesirable noise during normal vehicle operation.

A need therefore exists for a seatbelt retractor that reduces noise from the foregoing moveable parts.

SUMMARY OF THE INVENTION

Like existing seatbelt retractor assemblies, the invention has an inertial sensor that detects changes in vehicle speed. The inertial sensor has an inertial sensor mass, which is linked to a seatbelt retractor locking pawl by an actuator. The actuator moves with the mass by riding on its surface. The inventor has discovered that a significant amount of noise arises from movement of the actuator and components linked to it. Accordingly, in contrast to conventional designs, the surface of the mass is shaped to guide the actuator in a manner that controls its acceleration and therefore noise.

The guide surface can be shaped or formed with a unique profile to lessen noise and provide more positive locking and unlocking of the actuator.

The guide surface has an inner profile region wherein the actuator rests in the unlocked position at the near zero acceleration position that is inclined less than 15°, preferably less than 10° or even 5°, most preferably substantially flat. The inner profile region can extend across the entire guide surface of the inertial mass sensor to the full locked position of the actuator. In such a case the tilting of the sensor positively accelerates the actuator as it is pushed by the substantially flat or low angled inner profile on the guide surface. This creates a soft start contact between the sensor and the actuator thereby reducing rattle noise.

In a second embodiment of the invention the guide surface has an outer profile region which actually is curved to provide a deceleration of the actuator as it is being moved into the locked position. In this embodiment the inner profile of the actuator can be any shape that provides an initial positive acceleration of the actuator as the inertial sensor moves towards the locking position. At an inflection point or surface, between the inner profile creating a positive acceleration of the actuator and the outer profile, the acceleration transitions from positive to negative enabling the actuator to slow its impact velocity with the locking pawl or locking mechanism of the seatbelt retractor. This creates a "soft" locking impact further reducing locking noise.

The third embodiment of the present invention combines the inner profile and the outer profile with a middle transitional profile interposed between the two profiles. The actuator rests on the initial profile at near zero or low vehicle accelerations and moves quickly onto a ramped or inclined transitional profile having an increasing inclination to create a more positive acceleration of the actuator. This combination of profiles insures the actuator sees very little or no movement at low or near zero accelerations and decelerations of the vehicle relative to the inertial sensor. When the acceleration or deceleration of the vehicle is severe enough to tilt the sensor the rapid movement in the transitional profile enables the actuator to be more rapidly moved towards the locking position. Once nearing that position the actuator slides past an inflection point onto the outer profile and begins to decelerate slowing the velocity of the actuator thereby reducing the impact of the locking pawl and the associated locking mechanisms thereby softening the impact and reducing the noises generated upon moving into a locking position.

The benefits of the inner profile or the outer profile may be used separately or in combination while the transitional profile may be used with one or both of the inner and outer profiles. The transitional profile may provide different levels of acceleration of the actuator by using a variety of inclined profiles or curvatures.

In addition, the inertial sensor mass may have other profile portions or regions that cause different levels of acceleration of the actuator than the inner profile region or the outer profile region. Again, these different levels of acceleration may result from these portions having different curvatures relative to one another.

Hence, the guide surface may have a generally low angle or flat portion and may have a curved portion neighboring this flat portion. This low angle or flat portion causes a slower level of acceleration of the actuator than the curved portion. Other regions of the inertial sensor mass may be flat or curved to thereby control the acceleration and velocity of the actuator. The inertial sensor mass may be a standard "standing man" mass, having a wide portion and a narrow portion. The guide surface may be located on the wide portion.

Hence, movement of the actuator is controlled by the shape of the guide surface of the inertial mass. Indeed, the actuator may have more than one acceleration rate as it moves across the guide surface. By controlling the rate of acceleration of the actuator, noise is also controlled without reducing the overall sensor sensitivity significantly, in some cases actually increasing the initial sensor reaction sensitivity.

DETAILED DESCRIPTION OF THE INVENTION

Figure 1:
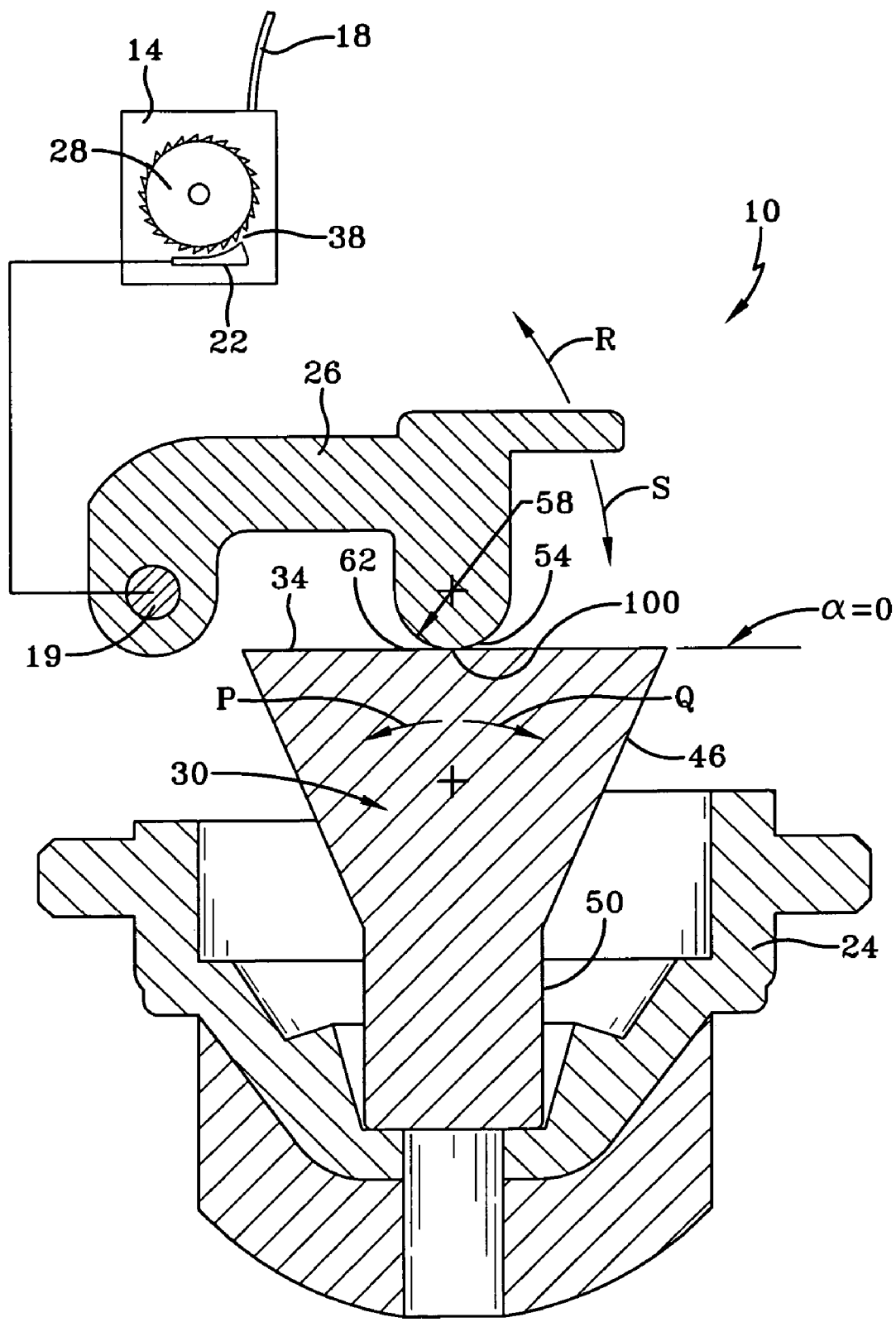
FIG. 1 is a side view of the inventive seatbelt retractor, showing a first embodiment inertial sensor mass, actuator and seatbelt retractor in an unlocked position.

FIG. 1 is a side view of an inventive seatbelt retractor assembly 10. The seatbelt retractor assembly 10 has a seatbelt retractor 14, which houses a seatbelt 18 as shown. Like conventional seatbelt retractors, the seatbelt retractor assembly 10 has a locking pawl 22, which is selectively engageable with a locking wheel 28. The locking wheel 28 has teeth to engage the locking pawl 22. When the locking pawl 22 is engaged with the locking wheel 22, the seatbelt retractor 14 prevents the seatbelt 18 from extending further from seatbelt retractor 14.

Figure 3:
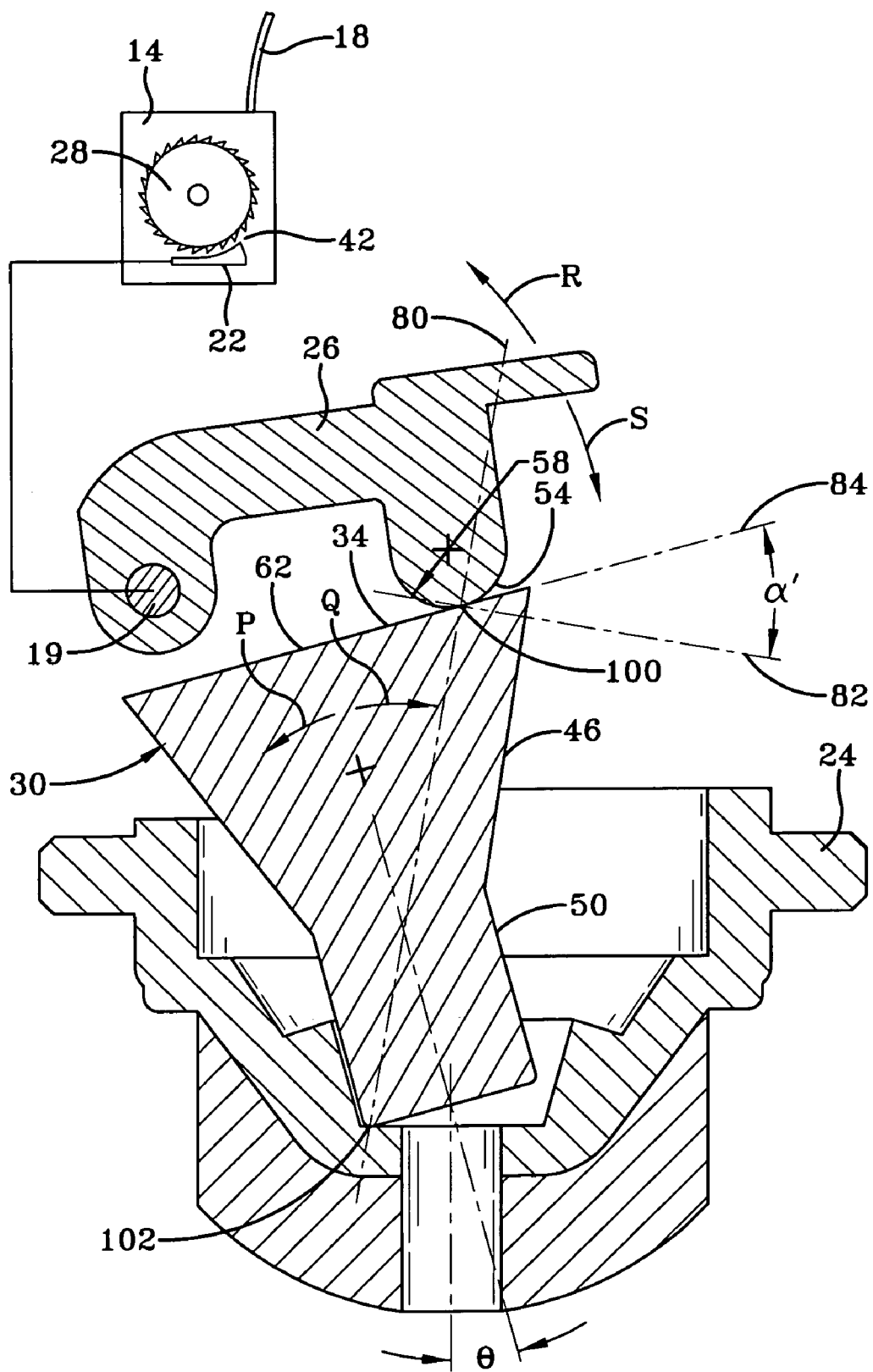
FIG. 3 illustrates the inventive seatbelt retractor assembly of FIG. 1 in a locked position.

As shown, the seatbelt retractor 14 has an inertial sensor, here an inertial sensor mass 30, which is responsive to vehicle acceleration. The inertial sensor mass 30 rests on a sensor housing 24, here shown schematically, and tips in the direction of either arrow P or arrow Q in response to vehicle acceleration. The inertial sensor mass 30 is linked to the locking pawl 22 by an actuator 26, an arm, which causes the locking pawl 22 to engage or disengage the locking wheel 28 depending upon the position of the inertial sensor mass 30. While the locking pawl 22 is shown schematically as a separate component from the actuator 26, the locking pawl 22 and actuator 26 may, in fact, be a single part. As shown in FIGS. 1 and 3, the actuator 26 interacts with a guide surface 34 through an actuator surface 54. The actuator surface 54 has an actuator curvature 58.

FIG. 1 illustrates the inertial sensor mass 30 in an unlocking position. When in this position, the actuator 26 maintains the locking pawl 22 in an unlocked condition, allowing the seatbelt 18 to be withdrawn from the seatbelt retractor 14. The actuator 26 is pivotally mounted by a pivot 19 so as to rotate in the direction of arrow R in response to movement of the inertial sensor mass 30 in the direction of arrow P or in the direction of arrow Q. In the event of a quick acceleration or deceleration of a vehicle, such as in a crash, the inertial sensor mass 30 responds by moving either in the direction of arrow P or in the direction of arrow Q. In either direction, the actuator 26 moves in the direction of arrow R.

As shown in FIG. 3, the inertial sensor mass 30 is shown having moved in the direction of arrow P from the unlocking position 38 shown in FIG. 1 to a locking position 42. Movement of the inertial sensor mass 30 has caused the actuator 26 to move in the direction of arrow R from the position shown in FIG. 1. This movement of the actuator 26 causes the locking pawl 22 to engage the teeth of the locking wheel 28. The return movement of the inertial sensor mass 30 in the direction of arrow Q towards the unlocking position 38 causes a return of the actuator 26 in the direction of arrow S to the position shown in FIG. 1.

In contrast to conventional inertial sensor masses, the inventive inertial sensor mass 30 has a unique guide surface 34 that controls the displacement, velocity and acceleration of the actuator 26 in the direction of arrow R and arrow S. By controlling the displacement, velocity and acceleration of the actuator 26 and consequently the locking pawl 22, noise from these moving components may be greatly reduced without reducing sensitivity significantly.

Figure 2A:
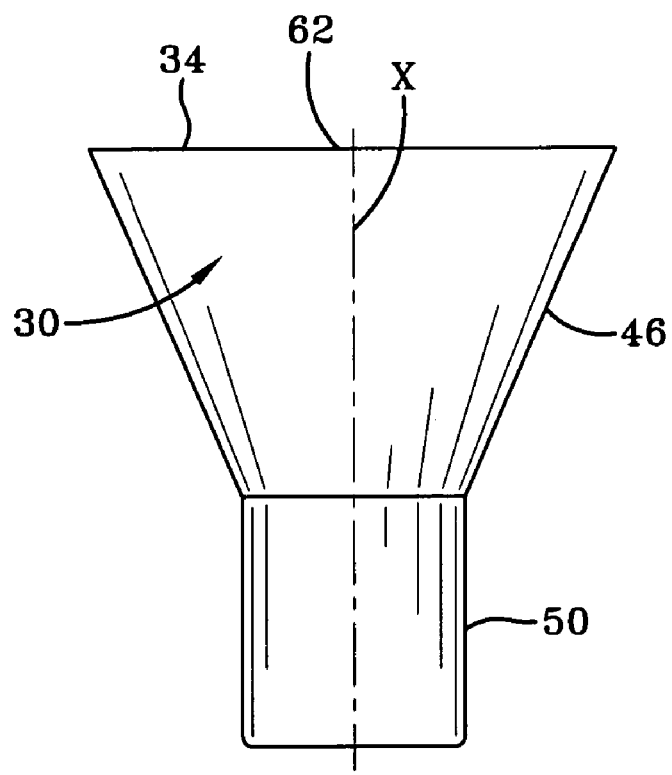
FIG. 2A is a side view of the inertial sensor of FIG. 1.
Figure 2B:
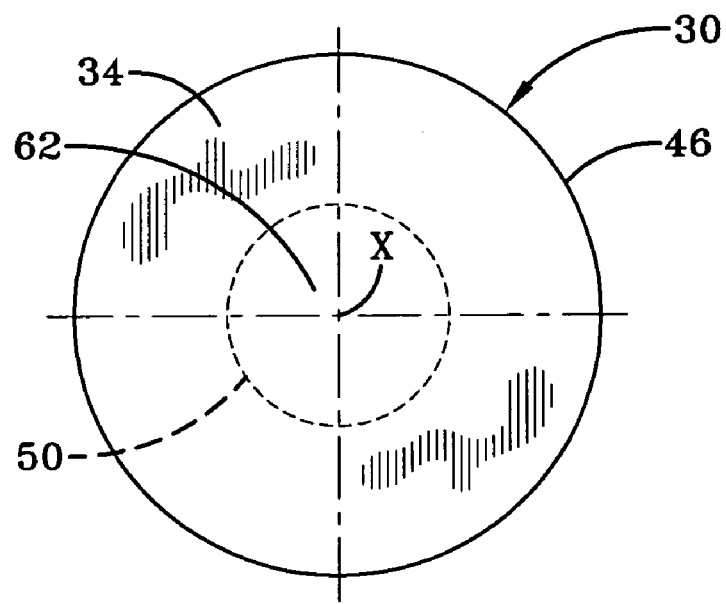
FIG. 2B is an overhead view of the inertial sensor mass of FIG. 1.

The guide surface 34 according to a first embodiment of the invention will now be explained in detail with reference to FIGS. 2A and 2B. As shown in FIG. 2A, the guide surface 34 is located on a wide portion 46 above a narrow portion 50. While the figures show a particular shape of a sensor upon which guide surface 34 sits, guide surface 34 may be implemented as any shape such as a ball or cylinder shape. The guide surface 34 comprises an inner profile region having a low angle or generally flat inner profile 62 near the center or the "near zero" vehicle acceleration location X. The prior art sensor has a conical guide surface inclined or sloped at 15° or greater. The present invention employs a guide surface 34 inclined at a surface angle alpha ($\alpha$) having less than 15° relative to the horizontal plane at the near zero vehicle acceleration preferably less than 10° or even 5° as shown about 0° or flat. This inner profile 62 can extend across the entire guide surface as shown in FIG. 2A and 2B. In such a case the pivotal movement of the actuator is minimized at low vehicle accelerations of insufficient size to tilt the sensor mass 30 but great enough to cause vibrations which can lead to rattle noises. While the slope of the inner profile region 62 should be less than 15° it must be appreciated a lower slope, like a slope angle alpha ($\alpha$) of 0° or flat, maximizes the benefits of reduced movement of the actuator 26 at the at rest or near zero vehicle acceleration condition. As shown the entire guide surface 34 may have the same profile as the inner profile 62. Alternatively other more inclined profiles may be used in combination with the inner profile 62 as will be discussed. The surface angle a and its relationship to the pivotal motion will be explained in greater detail, however, as the actuator 26 is pivotably moved as the guide surface 34 and sensor mass 30 tilt during a vehicle acceleration input the angle naturally changes. For simplicity purposes the surface angle $\alpha$ is shown as the angle of the guide surface 34 at the point of contact with the actuator surface 54 as measured from a horizontal plane as noted in FIG. 1 the angle $\theta$ is 0° as shown. This is how the guide surface of the sensor mass 30 appears relative to the horizontal plane. As the sensor mass tilts the actuator 26 pivots about the pivot 19 and the contact between the actuator surface 54 and the guide surface 34 changes such that the contact angle $\alpha$ is progressively moving in relation to the sensor tilt angle $\theta$. It is therefore possible to design a cam like guide surface 34 to control the movement of the actuator 26 by the following methods. As shown in FIG. 3, a line 80 is drawn through the actuator 26 and guide surface 34 contact point 100 and the pivot point 102 at the bottom of the narrow portion 50 of the sensor mass 30 relative to the housing 24, a second line 82 perpendicular to line 80 is drawn through the contact point 100. A third line 84 is drawn tangent to the guide surface 34 at the contact point 100. An angle α' between the line 84 and the line 82 defines a moving guide surface contact angle α' tangent to the guide surface 34 as the sensor 30 tilts about the pivot point 102 at that point of contact 100. Accordingly the moving contact angle α' is progressively changing as the sensor mass 30 pivots about this pivot point 102. Accordingly, the low or small α' inclinations cause a slow acceleration of the actuator 26 while large angles α' of positive slope result in faster accelerations and as will be discussed negative sloping curvatures can achieve decelerations of the actuator 26. By selecting a cam like guide surface similar to the guide surface 36 having features progressively outward from the at rest or near zero vehicle acceleration location X a complete control of the movement of the actuator 26 is possible. The second and third embodiments show the application of this methodology to create various actuator acceleration profiles to reduce noise.

Figure 4:
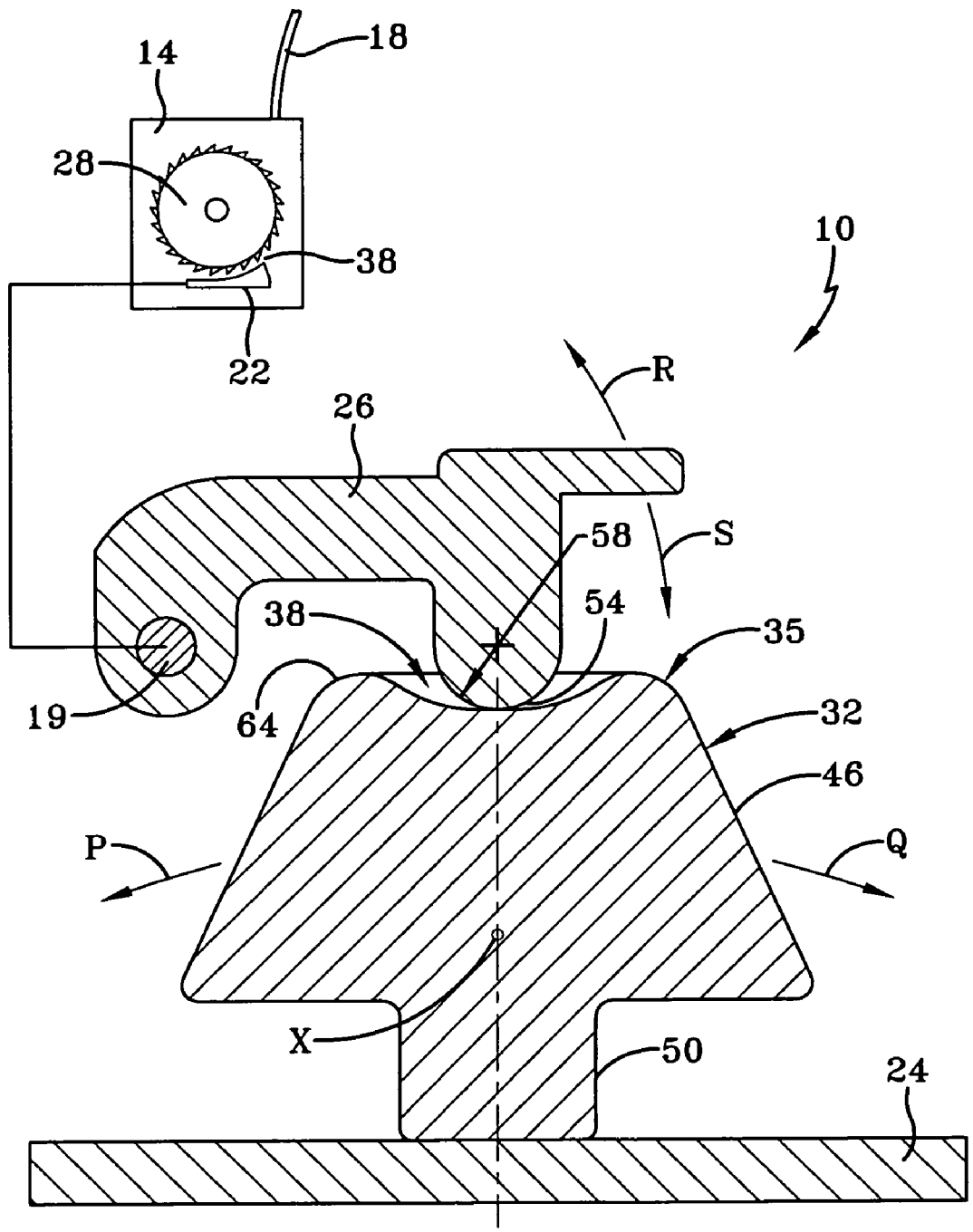
FIG. 4 is a side view of the inventive seatbelt retractor showing a second embodiment inertial sensor mass, actuator and seatbelt retractor in an unlocked position.
Figure 5:
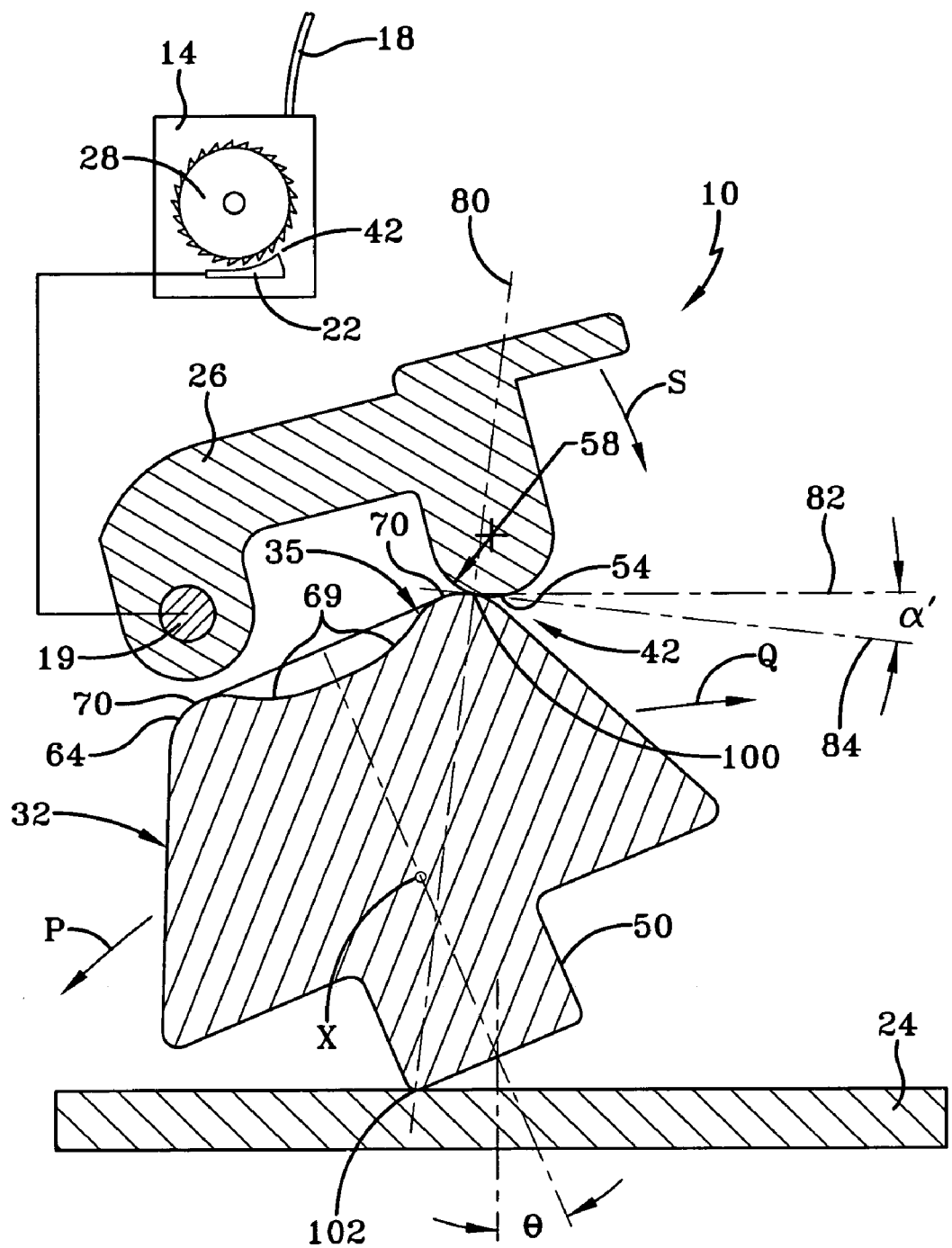
FIG. 5 illustrates the seatbelt retractor of FIG. 4 in a locked position.
Figure 6A:
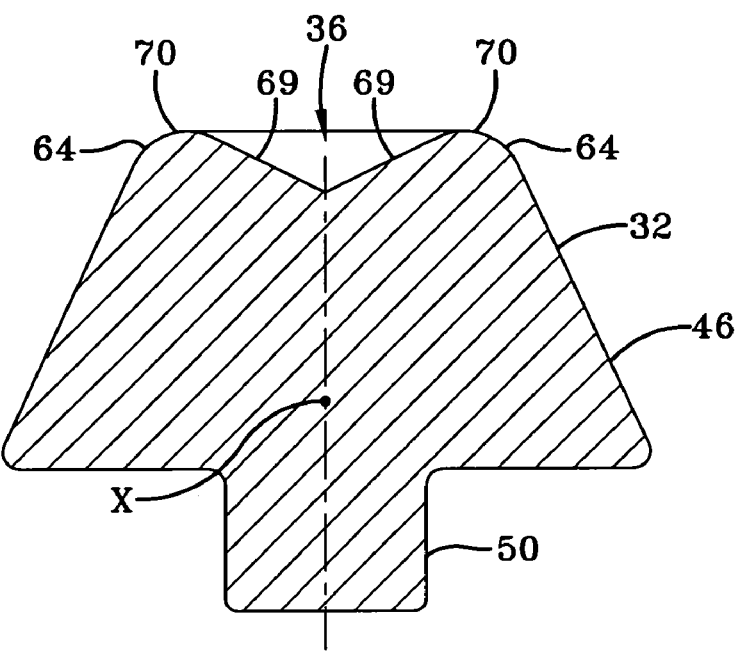
FIG. 6A is a side cross sectional view of an inertial sensor of FIG. 4.
Figure 6B:
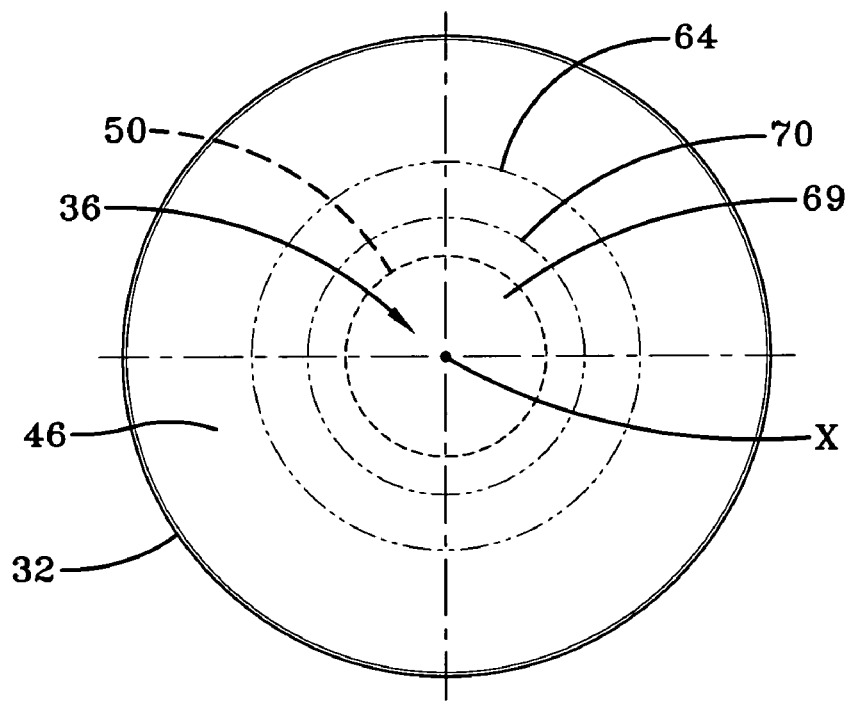
FIG. 6B is an overhead view of the second embodiment inertial sensor.

With reference to FIGS. 4-6B an inertial sensor mass 32 according to a second embodiment of the invention is illustrated. The sensor 32 has a guide surface 35 having an outer profile region 64, the outer profile region 64 initiates on a portion of guide surface 35 as contact with the actuator surface 54 along at least a portion of guide surface 35 as the actuator 26 is moved from the at rest and unlocked position 38 to an unlocked but in near proximity, to the full locked position 42. The sensor guide surface 35 as shown in FIGS. 4 and 5 has an inner profile 69 inward of the outer profile 64 which may include any particular curvature having a resulting positive acceleration of the actuator. By way of example as shown in FIGS. 6A and 6B a conical sloped depression 69 having an angle or slope α of 15° or greater or a slope angle α of less than 15°. With reference to FIG. 5 at a location 70 on the peripheral inner boundary of the outer profile 64 the positive acceleration of the inertial sensor mass 32 changes to a negative deceleration and the sensor guide surface 3S has a reverse slope change in curvature causing a deceleration of the actuator. The change in curvature creates a negative slope or angle inclination α' relative to the guide surface 3S at the contact point 100 as measured relative to lines 82 and 84, line 82 being perpendicular to line 80, as previously discussed. This results in the movement of the actuator 26 to slow down or decelerate as the sensor mass 32 tips at the pivot point 102 to the fully closed position as shown this is at a tilt angle θ of about 20 degrees, although the angle θ can be any angle selected for the proper tilt of a particular inertial sensor. As the acceleration changes from positive to negative at the inflection location 70, 70 ringing the outer profile 64, the speed of actuator 26 movement slows. The resultant effect of this slowing is a softer impact force occurs as the actuator 26 moves the locking pawl 22 into engagement with the locking teeth. This in turn reduces noises caused by locking.

Figure 7:
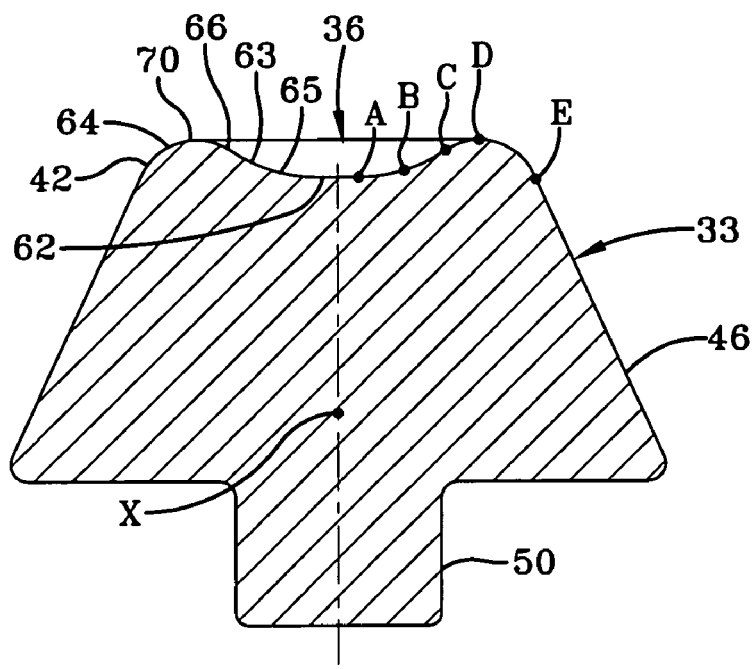
FIG. 7 is a side view of a third embodiment inertial sensor combining in initial profile of first embodiment with the outer profile of the second embodiment via an interposed transitional profile.

With reference to FIGS. 7-10C a third and preferred embodiment of the invention is illustrated. The sensor 33 as illustrated in FIG. 7 has a guide surface 36 having the inner profile 62 of the first embodiment and an outer profile 64 of the second embodiment with a transition profile 63 interposed between the two profiles 62, 64 respectively. As is better illustrated in the enlarged view of FIG. 9. For simplicity the actuator 26 is not shown, but is described in relation to the profile regions of the guide surface 36. It being understood how the guide surface interacts with the actuator 26 from the previous discussion. The transition profile 63 has an inner portion 65 having steep slope curve, as shown the curve progressively increases in slope from the inner profile 62 and at an inflection point 72 thereafter progressively decreases in slope to decrease the rate of acceleration of the actuator 26 as the sensor mass 33 tilts toward the locking position 42. The circumferential outer portion 66 of the transition profile 63 then smoothly connects to the outer profile 64 wherein the deceleration of the actuator 26 reaches a maximum prior to reaching the locking position 42.

FIGS. 1OA, 1OB and 1OC are graphs exemplary of the displacement, velocity and the acceleration profile of the actuator 26 being guided by the preferred guide surface 36.

Figure 8:
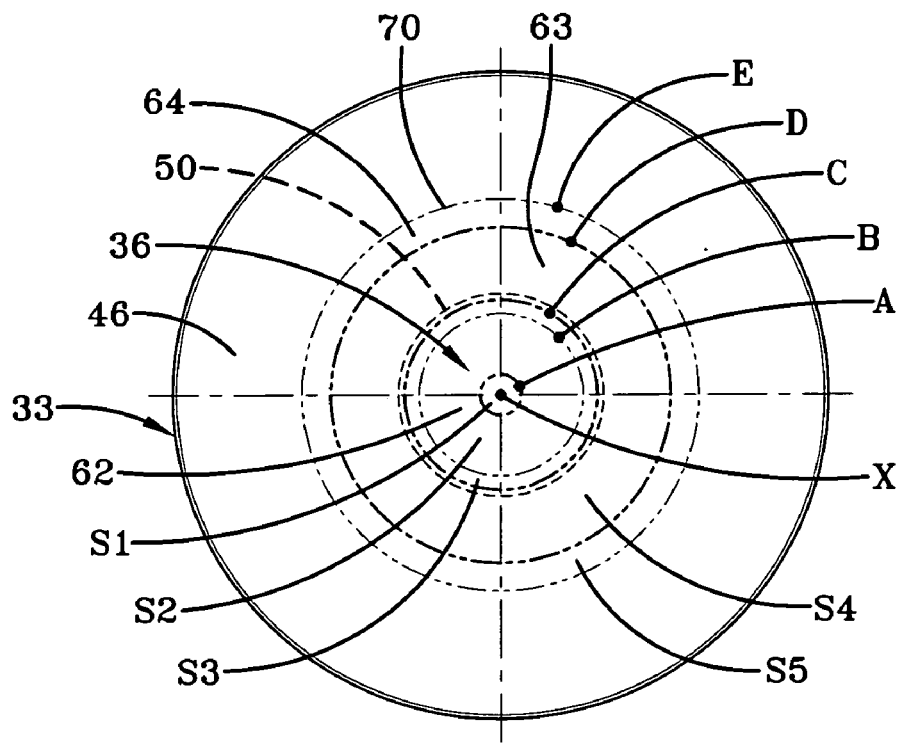
FIG. 8 is an overhead view of the third embodiment inertial sensor.

As shown in FIGS. 7 and 8, the guide surface 36 has three primary profile portions, the inner profile portion 62 from X to A; the transition profile portion 63 from A to B, and B to C; and the outer profile portion 64 from C to D and D to E. These portions have differing curvatures. Here the inner profile portion 62 at X to A curves away from the curvature 58 of the actuator surface 54 and is generally flat. Consequently, movement over this portion of the inertial sensor mass 33 causes little acceleration and movement of the actuator 26. Because the actuator 26 is in contact with portion X to A in the unlocking position 38, the actuator 26 will have reduced responsiveness for this region. The actuator 26 and locking pawl 22 consequently move very little, thereby reducing noise generation.

Figure 9:
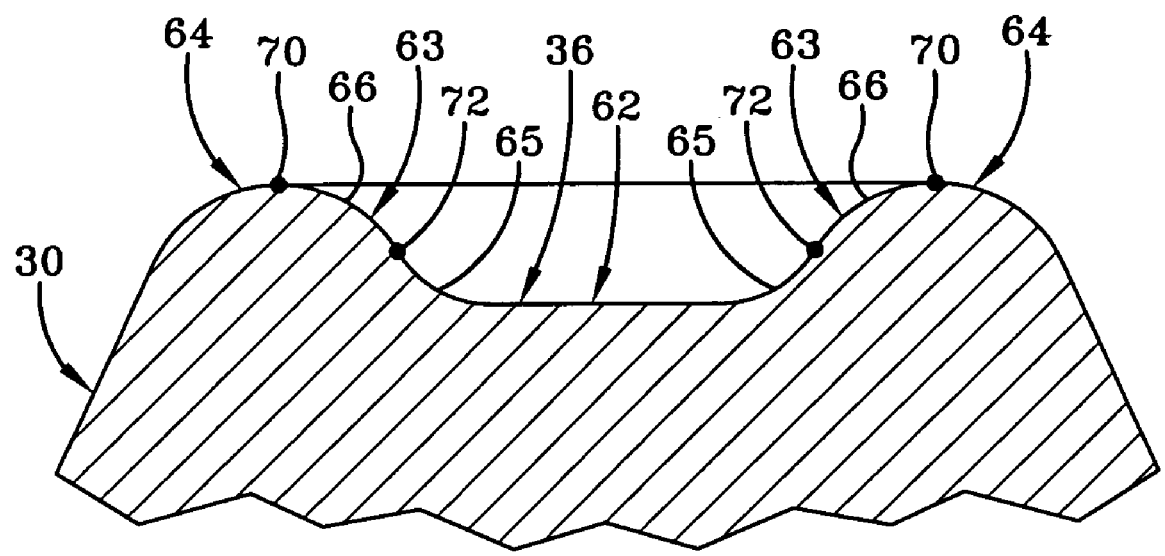
FIG. 9 is an enlarged view of the guide surface taken from FIG. 7.
Figure 10A:
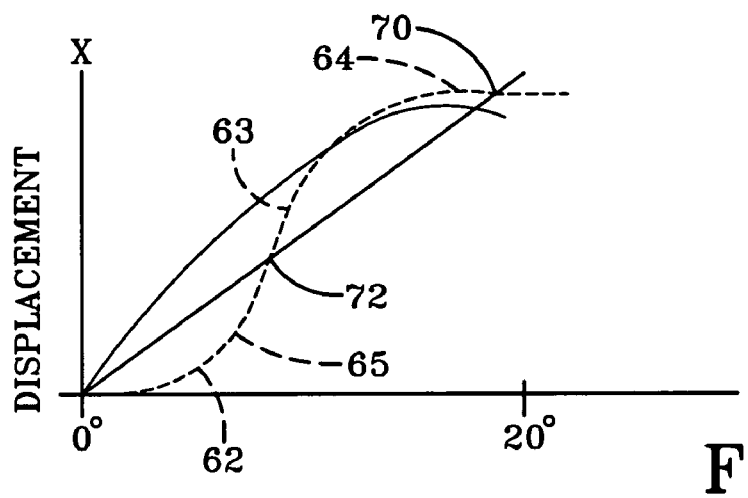
FIG. 10A, 10B and 10C are exemplary graphical representations of the actuator displacement, velocity and acceleration respectively as the inertial sensor tilts to the fully locked position from the unlocked.
Figure 10B:
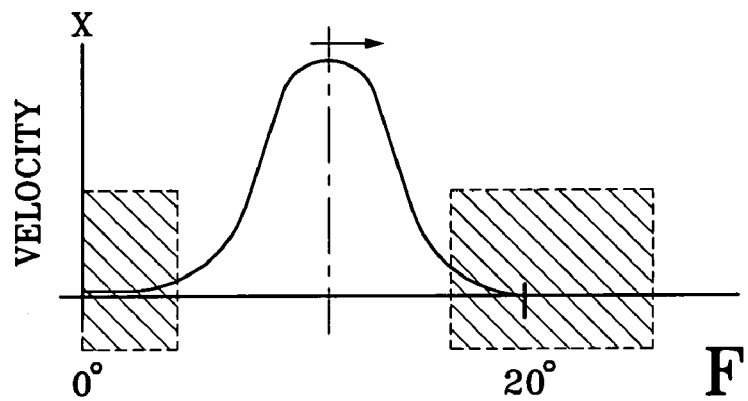
Figure 10C:
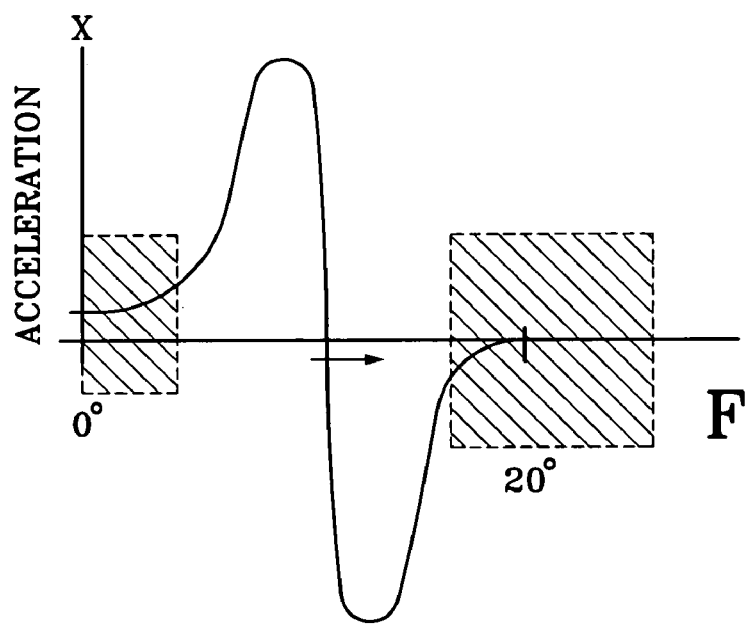

While portion X to A defining the inner profile 62 is shown in FIG. 9 as generally flat, i.e. having little or zero curvature, other curvatures that curve away from the curvature 58 of the actuator surface 54 may be used to achieve the same object of causing little movement of the actuator 26 in the direction of arrow R when the inertial sensor mass 33 teeters in the direction of either arrow P or arrow Q. For example, as shown in FIG. 9, portion X to A need only have a curvature greater than the curvature of actuator surface 54 to reduce movement of actuator 26 and thereby reduce noise. Indeed it may be preferable for portion X to A to have a curvature opposite the curvature 58 of actuator surface 54. By curving the guide surface 36 away from the curvature 58 of actuator surface 54, movement of the inertial sensor mass 33 causes little or no displacement of actuator 26 in the direction of arrow R for this region of the inertial sensor mass 33.

However, in the event of a crash, the inertial sensor mass 33 moves the guide surface 36 to the locking position 42. The actuator 26 will pass from the inner profile portion X to A to the transition profile 63 first portion 65 at location A to B, which is curved upwards having a radius of curvature on the same side and toward the actuator surface 54 to increase acceleration of the actuator 26 to lock the seatbelt retractor 14. Portion 65 at location A to B is then followed by a second portion of the transition profile B to C, which curves with a radius of curvature in an opposite direction, i.e., originating inside the profile and downwards away from the actuator surface 54, extending to the curvature to location D from location A to B to thereby slow the actuator 26. The actuator 26 is further slowed by generally flat curved portion of the outer profile 64 from location C to D and rapidly slowed by a deceleration profile at an outermost portion of the outer profile 64 from location D to E, which also curves downwards. In this way, movement of the actuator surface 54 across the guide surface 36 can be controlled to have different levels of acceleration so that the actuator 26 may initially move slowly in response to movement of the inertial sensor mass 33 guide surface 36, then rapidly, and then slowly. As a consequence, during normal vehicle operation, the actuator 26 will move very little if at all due to portion X to A. However, in the event of a crash, the actuator 26 moves rapidly because of the curvature of portion 65 at location A to B and is slowed at locations B to C, C to D and D to E to gently place the locking pawl 22 into a locking position 42 rather than rapidly as with conventional designs.

Accordingly, as shown in FIG. 8, the guide surface 36 causes the actuator 26 to have different levels of acceleration. For the portion 62 between X and A, the actuator 26 has an acceleration $S_1$, which is very little acceleration, if any. Over the portion 65 between A to B, the actuator is imparted with an acceleration $S_2$, which is a rapid acceleration and faster than the acceleration of $S_1$. In the portion 66 from B to C, the curvature causes the actuator 26 to encounter an acceleration level $S_3$, which decelerates the actuator 26. In the portion 62 from C to D, the actuator 26 has little to no acceleration and is provided with an acceleration rate $S_4$. In the region of the outer profile 64 from D to E, the actuator 26 is again decelerated at a deceleration $S_5$ to rapidly slow the actuator 26. It is in the outer portions of this region that it is anticipated that the actuator 26 should not be moving because the locking pawl 22 should be engaged with the locking wheel 28 prior to reaching this portion.

While the profiles of the guide surface 34, 35, 36 may take any variety of shapes or curvatures it is believed desirable that the inner profile 62 have a low inclination or flat surface, the transition profile 63 provide a rapid acceleration or steeply curved portion and the outer profile 64 provide a deceleration or negatively sloped curvature to slow the movement of the actuator 26 just prior to locking.

As noted the features of the inner profile 62 as shown in FIGS. 1-3 can be used without the outer profiles 64 or with combination of various profiles to achieve the at near 0 vehicle acceleration noise reduction. Similarly the outer profile 64 shown in FIGS. 4-6B can be used to soften contact impacts at locking with or without the inner profile 62 as disclosed. Alternatively the inner and outer profiles 62 and 64 when used in combination provide the beneficial aspects of both profiles, particularly when used with the transitional profile 63 as illustrated in FIGS. 7 through 10C.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A seatbelt retractor assembly comprising:
    a seatbelt retractor;
    an actuator for locking and unlocking said seatbelt retractor;
    an inertial sensor mass for detecting changes in vehicle acceleration resting on a sensor housing, said inertial sensor mass having a wide portion above a narrow portion, the narrow portion having a bottom with a pivot point of the sensor mass relative to the housing which establishes the sensor mass tilt angle θ, the wide portion having a guide surface for interacting with an actuator surface to move said actuator;
    said guide surface being horizontally and vertically movable between an unlocking position wherein said actuator unlocks said seatbelt retractor and a locking position wherein said actuator locks said seatbelt retractor as the inertial sensor tilts about the pivot point; and
    said guide surface comprising an inner profile portion and an outer profile portion, said actuator surface in contact with said inner profile portion in said unlocking position and continuing in contact with said outer profile portion as said actuator moves toward said locking position, said outer profile portion causing a deceleration, thereby slowing said actuator prior to said locking position.

2. The seatbelt retractor assembly of claim 1 wherein said outer profile portion causes a deceleration of said actuator surface and said inner profile portion causes an acceleration of said actuator surface.

* * * * *